United States Patent
Lee

(10) Patent No.: US 7,952,614 B2
(45) Date of Patent: May 31, 2011

(54) APPARATUS AND METHOD FOR DIGITAL IMAGE STABILIZATION USING OBJECT TRACKING

(75) Inventor: Young-Sin Lee, Seoul (KR)

(73) Assignee: Core Logic, Inc., Seoul (KR)

( * ) Notice: Subject to any disclaimer, the term of this patent is extended or adjusted under 35 U.S.C. 154(b) by 399 days.

(21) Appl. No.: 12/262,968

(22) Filed: Oct. 31, 2008

(65) Prior Publication Data
US 2009/0115858 A1    May 7, 2009

(30) Foreign Application Priority Data
Nov. 2, 2007  (KR) .................. 10-2007-0111485

(51) Int. Cl.
*H04N 5/228* (2006.01)
*G06K 9/00* (2006.01)
*G03B 17/00* (2006.01)

(52) U.S. Cl. ............ 348/208.99; 348/208.14; 348/208.4; 382/103; 396/55

(58) Field of Classification Search ............. 348/208.99, 348/208.4, 169–172; 396/55; 382/103
See application file for complete search history.

(56) References Cited

U.S. PATENT DOCUMENTS

| | | | |
|---|---|---|---|
| 6,985,172 B1 * | 1/2006 | Rigney et al. | 348/149 |
| 7,773,115 B2 * | 8/2010 | Estevez et al. | 348/208.13 |
| 2001/0017650 A1 * | 8/2001 | Bober et al. | 348/158 |
| 2003/0035051 A1 * | 2/2003 | Cho et al. | 348/169 |
| 2003/0223010 A1 | 12/2003 | Kaplinsky et al. | |
| 2006/0017837 A1 | 1/2006 | Sorek et al. | |
| 2006/0127084 A1 | 6/2006 | Okada | |
| 2007/0014554 A1 | 1/2007 | Sasaki et al. | |
| 2007/0147820 A1 * | 6/2007 | Steinberg et al. | 396/155 |
| 2010/0026839 A1 * | 2/2010 | Border et al. | 348/231.2 |

FOREIGN PATENT DOCUMENTS

| | | |
|---|---|---|
| EP | 1672914 A2 | 6/2006 |
| JP | 2006-157568 A | 6/2006 |
| JP | 2006-174069 A | 6/2006 |
| JP | 2006-191305 A | 7/2006 |
| JP | 2006-325274 A | 11/2006 |
| JP | 2007274731 | 10/2007 |
| KR | 2007-0088528 A | 8/2007 |
| WO | WO 2006/097680 | 9/2006 |

* cited by examiner

*Primary Examiner* — Lin Ye
*Assistant Examiner* — Mekonnen Dagnew
(74) *Attorney, Agent, or Firm* — Edwards Angell Palmer & Dodge LLP; Kongsik Kim

(57) ABSTRACT

Apparatus for digital image stabilization using object tracking can produce a digital still image free of an image blurring phenomenon caused by shaky hands without separate hardware and can produce an image that is bright, clear, and noise free. The apparatus includes an image signal processing unit that outputs a first digital image obtained under a first exposure value condition and a plurality of second digital images obtained under a second exposure value condition. The apparatus also includes a shaky hand compensating unit that compensates for motion in comparative second digital images relative to a reference second digital image using object tracking. The compensating unit then generates a shaky hand compensated image by overlapping each compensated comparative image with the reference image. The apparatus further includes an image property correcting unit that corrects a property of the shaky hand compensated image based on a property of the first digital image.

25 Claims, 10 Drawing Sheets

APPARATUS AND METHOD FOR DIGITAL IMAGE STABILIZATION USING OBJECT TRACKING

CLAIM OF PRIORITY

This application claims priority under 35 U.S.C. §119(a) to Korean Patent Application No. 10-2007-0111485, filed on Nov. 2, 2007, in the Korean Intellectual Property Office, the entire contents of which are hereby incorporated by reference.

FIELD OF THE INVENTION

The invention relates to digital image processing, and in particular, to apparatus and method for digital image stabilization that can correct an image blurring phenomenon caused by shaky hands at the time of obtaining a digital image.

BACKGROUND OF THE INVENTION

Recently, digital cameras using an image sensor technology such as CCD (Charge Coupled Device) or CMOS (Complementary Metal-Oxide Semiconductor) have become very popular. The digital camera is commercialized as a camera-only-product and typically is mounted in a hand-held terminal such as a mobile phone or PDA (personal digital assistant).

However, the central processing unit of the hand-held terminal does not have the high clock speed and memory capacity of a personal computer, which may limit the hand-held terminal's ability to perform digital image processing. Moreover, development trends toward reduced thickness and size of the hand-held terminal results in a spatial limitation with respect to the size of additional hardware and devices, such as a camera, that can be mounted in a hand-held terminal. Accordingly, there are limitations in the numbers and types of image processing techniques (e.g., digital image stabilization techniques for preventing deterioration of a digital image caused by shaky hands of a photographer) that can be incorporated in a camera-only-product of a hand-held terminal.

A typical digital camera supports an auto exposure mode, where EV (Exposure Value) is automatically changed depending on the luminance of the location where a photograph is taken. EV is increased in dark places and decreased in bright places.

However, an increase in EV causes an increase in exposure time. This can result in an image blurring phenomenon since a small tweak in focus caused by shaky hands is reflected in a photograph. Known image stabilization techniques were introduced to prevent the image blurring phenomenon, such as, for example DIS (Digital Image Stabilization), EIS (Electrical Image Stabilization), and OIS (Optical Image Stabilization).

The DIS technique detects/compensates for the shaky-hands effect using an image signal stored in a memory. The DIS technique detects a motion vector using an image signal that is generated in an image pickup device and stored in a memory, and changes a read timing of the memory using the detected motion vector to compensate for shaky hands. The DIS technique has an advantage of simple image stabilization. However, because a read timing of a memory is changed, the size of an image readable from the memory is equal to that of an effective pixel area. Thus, the DIS technique expands an image read from the memory by digital zoom and plays/records the expanded image, which results in deterioration of image quality.

The EIS technique detects/compensates for the shaky-hands effect using an angular velocity sensor and a high pixel image pickup device. The EIS technique detects the amount and direction of hand tremor using a horizontal/vertical angular velocity sensor, and changes an output timing of a high pixel image pickup device using the detected amount and direction of hand tremor to compensate for shaky hands. As an output timing of a high pixel image pickup device is changed, the size of an image that is composed of an image signal output from the high pixel image pickup device is equal to that of an original image. This occurs because the high pixel image pickup device used in the EIS technique has more pixels than the number of effective pixels. Thus, the EIS technique can reduce the deterioration of image quality. However, the EIS technique requires an angular velocity sensor and a high pixel image pickup device, which results in an increase in manufacturing costs.

The OIS technique detects/compensates for the shaky-hands effect using an angular velocity sensor and a prism. The OIS technique uses the same technique as the EIS technique in that the amount and direction of hand tremor is detected using a horizontal/vertical angular velocity sensor. However, the difference is that the OIS technique uses a prism capable of changing a path of light incident upon an image pickup device to compensate for shaky hands. The OIS technique does not result in a deterioration of image quality and does not require a high image pickup device. However, the OIS technique requires an angular velocity sensor and a prism, which increases both the size and manufacturing costs of a photographing device. Further, the OIS technique has difficulty controlling the prism.

SUMMARY OF THE INVENTION

An object of the invention is to provide a method for digital image stabilization that eliminates the need for separate hardware, such as an angular velocity sensor or a prism, to compensate for shaky hands.

Another object of the invention is to provide a method for digital image stabilization that reduces the deterioration of image quality and an image blurring phenomenon in a digital camera mounted in a terminal having limited hardware resource, such as a mobile phone or PDA.

To achieve the above-mentioned objects, an apparatus for digital image stabilization using object tracking according to the invention includes: (1) an image signal processing unit for outputting a first digital image data obtained under a first exposure value condition and a plurality of second digital image data obtained under a second exposure value condition; (2) a shaky hand compensating unit to (a) compensate for motion of comparative second digital images relative to a reference second digital image through object tracking, and (b) generate a shaky hand compensated image by overlapping each compensated comparative image with the reference image; and (3) an image property correcting unit for correcting a property of the shaky-hand compensated image based on a property of the first digital image.

According to the invention, the apparatus further includes an exposure mode converting unit for determining adaptively the second exposure value condition based on the first exposure value condition and then changing an exposure property of an image sensor from the first exposure value condition to the second exposure value condition.

Preferably, the first exposure value condition is of an auto exposure mode, and the second exposure value condition corresponds to a luminance lower than the luminance of the auto exposure mode.

Preferably, the first digital image data is a preview image data obtained in the auto exposure mode, and the second digital image data is a full-size captured still image data generated continually at a regular time interval in an image capture mode.

According to the invention, the shaky-hand compensating unit includes: (1) an object labeling unit for classifying a plurality of second digital images into a reference image and comparative images and for labeling an object of the reference image and an object of each comparative image using object tracking; (2) a motion value computing unit for matching the object of each comparative image with the object of the reference image, for calculating a parameter of the matched object and for computing a motion value of each comparative image relative to the reference image by the calculated parameter; (3) a motion compensating unit for applying each computed motion value to a corresponding comparative image to compensate for motion of each comparative image; and (4) a compensated image generating unit for overlapping each motion-compensated comparative image with the reference image to generate a shaky-hand compensated image.

Preferably, the object labeling unit includes: an image binarization unit for converting the reference image and each comparative image into binary images, and an object labeler for extracting objects from the reference binary image and each comparative binary image and for labeling the extracted objects. More preferably, the object labeling unit further includes: an image filter for filtering the reference image and each comparative image to the boundary-sharpened images; and an image synthesizer for synthesizing the boundary-sharpened images outputted from the image filter with the binary images. In this case, the object labeler labels objects from the synthesized images.

According to the invention, the apparatus may further include an image resizer before the object labeling unit for resizing a plurality of second digital images by either scaling sizes of the second digital images to a predetermined size or clipping boundaries of a predetermined width from the second digital images. The apparatus may alternatively include an image selecting unit before the object labeling unit for excluding a comparative image from images for object labeling if the magnitude of a motion vector of the comparative image relative to the reference image exceeds a critical value or if a difference in brightness between the reference image and the comparative image does not exceed a critical value.

In the invention, a motion value of each comparative image includes any one selected from the group consisting of a motion value according to translation, a motion value according to rotation, a motion value according to scaling, a motion value according to shear, or combinations thereof.

Preferably, the image property correcting unit includes a color correcting unit for correcting the color of the shaky-hand compensated image by replacing pixel data of the shaky-hand compensated image with pixel data of the first digital image, or by interpolating pixel data of the shaky-hand compensated image based on pixel data of the first digital image in consideration of a size ratio between the first digital image and the shaky-hand compensated image. The image property correcting unit may additionally or alternatively include a brightness correcting unit for computing quantitatively a difference in brightness between the first digital image and the shaky-hand compensated image, for selecting adaptively a brightness correcting intensity, and for correcting the brightness of the shaky-hand compensated image by the selected intensity.

The invention also includes methods of digital image stabilization using object tracking.

BRIEF DESCRIPTION OF THE DRAWINGS

The features and advantages of the invention will become more apparent upon consideration of the detailed description taken in conjunction with the accompanying drawings, in which like reference characters refer to like parts throughout, and in which.

DETAILED DESCRIPTION OF THE INVENTION

Figure 1:
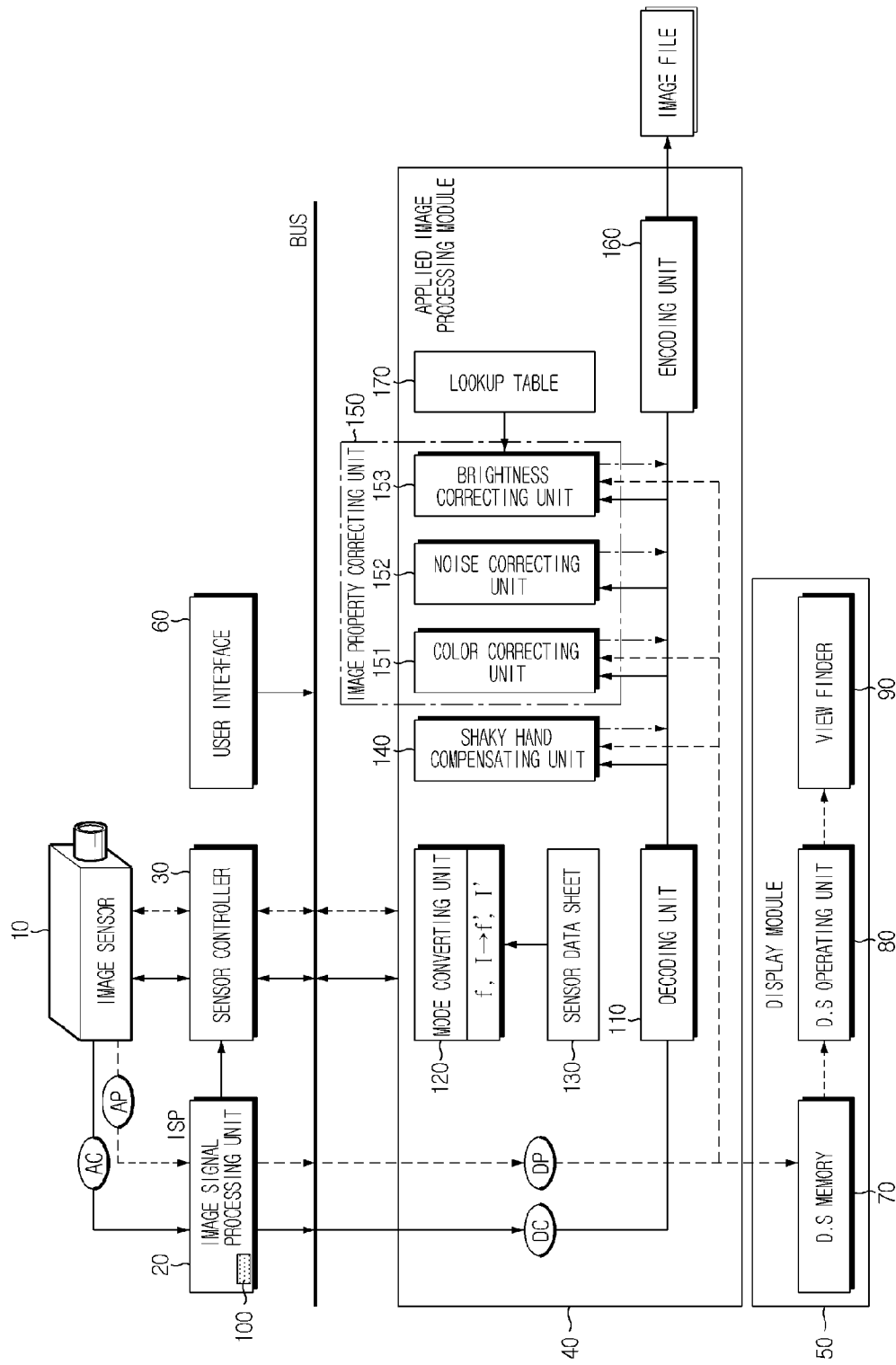
FIG. 1 is a block diagram illustrating an apparatus for digital image stabilization using object tracking according to an embodiment of the invention.

While this specification contains many specifics, these should not be construed as limitations on the scope of the invention or the claims, but rather as descriptions specific to particular embodiments of the invention. Certain features that are described in this specification in the context of separate embodiments may also be combined in a single embodiment. Conversely, various features that are described in the context of a single embodiment may also be implemented in multiple embodiments separately or in any suitable sub combination.

It should be understood that the terms used in the specification and the appended claims are not necessarily limited to general and dictionary meanings, but should be interpreted based on the meanings and concepts corresponding to the technical aspects of the invention as described herein.

An apparatus for digital image stabilization using object tracking according to the invention is mounted in various digital photographing devices. Digital photographing devices include, for example, a digital camera, a digital camcorder, a mobile phone, a PDA (personal digital assistant) and a personal multimedia player with built-in digital camera. Digital photographing devices are configured to obtain an image of a subject by a user's operation of a shutter, which converts the obtained image into a digital image and stores the digital image in a storage medium.

Unlike a conventional camera, the commercial digital photographing device supports a preview function for viewing an image of a subject to be included in the photograph through a view finder having a display such as an LCD (liquid crystal display). A user typically checks an image through the view finder in a preview mode, wherein the image changes at a short frame interval according to movement of the digital photographing device, and when the user catches a desired optimum image, the user operates a shutter to obtain a digital still image of the subject.

Apparatus for digital image stabilization using object tracking according to the invention obtains a first digital image taken under a first exposure value condition and a plurality of second digital images taken under a second exposure value condition (which is less than the first exposure value condition), computes a motion value for each comparative second digital image relative to a reference second digital image by object tracking, compensates for motion of the corresponding second digital image according to each computed motion value, overlaps the motion-compensated image(s) with the reference image to generate a shaky-hand compensated image, and corrects a property of the shaky-hand compensated image using a property of the first digital image.

In the exemplary embodiments of the invention, the first digital image is a preview image, and the second digital image is a captured still image. The preview image is a digital image displayed on a view finder at a short time interval before an operation of a shutter, and the captured still image is a still digital image of a subject taken with a resolution set by a user at the time of shutter operation. However, the invention is not limited in this regard. The first digital image should be interpreted as a digital image captured in the higher exposure value condition than the second digital image and taken at such a short frame interval to remove the influence of shaky hands effect.

Referring to FIG. 1, apparatus for digital image stabilization using object tracking according to the invention is mounted in various digital photographing devices and performs an image stabilization function. The apparatus includes an image sensor 10, an image signal processing unit 20, a sensor controller 30, an applied image processing module 40, an image display module 50, and a user interface 60.

The image sensor 10 picks up an image of a subject and outputs an analog image signal of the image to the image signal processing unit 20. Preferably, the image sensor 10 is an image pickup device using CCD (Charge Coupled Device) or CMOS (Complementary Metal-Oxide Semiconductor) technology. However, the invention is not limited to a specific kind of image sensor.

The image sensor 10 generates and outputs a preview image (AP) of a subject at a short frame interval (for example, 30 f/s) before a shutter of the digital photographing device operates. When the shutter of the digital photographing device operates, the image sensor 10 outputs a plurality of captured still images (AC) of the subject at a regular interval.

The plurality of captured still images (AC) are outputted at longer frame intervals than the preview image (AP). The preview image (AP) and the plurality of captured still images (AC) are generated under first and second exposure value conditions, respectively. Here, the exposure value is abbreviated EV, and is defined by parameters including 'f' representing a shutter speed of the image sensor 10 and ISO gain (hereinafter referred to as 'I') representing sensitivity of the image sensor 10. The exposure value of the image sensor 10 is set by the sensor controller 30. As the exposure value increases, an exposure time of the image sensor 10 increases. Specific 'f' and 'I' values corresponding to a specific exposure value are defined in advance by the manufacturing company of the image sensor 10 and are referenced in a lookup table.

Preferably, the first exposure value is larger than the second exposure value. That is, when the first exposure value is EV1 and the second exposure value is EV2, a condition of 'EV1>EV2' is satisfied. Preferably, the first exposure value is an exposure value corresponding to an auto exposure mode of the digital photographing device. Alternatively, the first exposure value may be set arbitrarily by a user through the user interface 60 or may be increased or decreased as much as a preset width based on an exposure value corresponding to the auto exposure mode. The increment or decrement width is set by the manufacturing company of the digital photographing device.

Preferably, the preview image (AP) generated under the first exposure value condition is the last image generated in preview mode as provided through a view finder 90 of the image display module 50 before operation of the digital photographing device's shutter. For reference, the preview image is stored in a display memory 70 by the applied image processing module 40, and the stored preview image is outputted in the form of a moving image through a display of the view finder 90 by a display operating unit 80.

The preview image (AP) is generated continually at a very short frame interval. Accordingly, the preview image (AP) obtained under the first exposure value condition is free of an image blurring phenomenon caused by shaky hands of a photographer. The preview image (AP) has substantially the same range of the subject as the plurality of captured still images (AC) obtained through operation of the shutter. Because the preview image (AP) is generated in the auto exposure mode, it thus retains the brightness and color properties of the subject better than at a lower exposure value condition.

The captured still image (AC) is an image obtained under the second exposure value condition when the shutter of the digital photographing device operates. The captured still image (AC) is obtained under a condition of shorter exposure time than the first exposure value condition of the preview image (AP). As the exposure time of the image sensor 10 decreases, the influence of shaky hands decreases. However, if the exposure time decreases when the captured still image (AC) is obtained, the captured still image (AC) does not retain the brightness and color properties of the subject as well as the preview image (AP).

The image signal processing unit 20 receives an analog image signal outputted from the image sensor 10. The signal processing unit 20 converts the analog image signal into a digital image signal and outputs the digital image signal to the applied image processing module 40. The digital image signal includes a brightness signal (Y) and color difference signals (Cb and Cr) of a pixel included in the image. The digital image signal may be a signal in color coordinate systems other than the YVU (YCbCr) color coordinate system, for example RGB (Red, Green, Blue).

Before the shutter of the digital photographing device operates, the image signal processing unit 20 receives the preview image (AP) generated in the image sensor 10 at a regular frame interval. Processing unit 20 then converts the preview image (AP) into a digital image signal and downscales the digital image signal in conformity with a standard resolution of the display of the view finder 90 (for example, 320*240 or 240*320). Meanwhile, when the shutter of the digital photographing device operates, the image signal processing unit 20 receives the plurality of captured still images (AC) generated continually at a regular frame interval in the image sensor 10, converts the captured still images (AC) into digital image signals, and downscales the digital image signals in conformity with a resolution (320*240 or 256*192) set by the photographer. The preview image (DP) and the plurality of captured still images (DC) processed by the image signal processing unit 20 are outputted to the applied image processing module 40. A size of the preview image (DP) is downscaled to a size of the display of the view finder 90, and thus is smaller than that of the captured still image (DC). The downscaling of the preview image (DP) and the captured still image (DC) may be performed by the applied image processing module 40.

The image signal processing unit 20 may include an image encoding unit 100 for encoding the digital image signal. Preferably, the image encoding unit 100 encodes the digital image signal in accordance with the JPEG (Joint Photographic Experts Group) standards. However, the invention is not limited to a specific encoding method. The image encoding unit 100 can encode only a captured still image (DC) converted into a digital image signal, and in some cases, an image encoding process may be omitted. In those cases where the image signal processing unit 20 encodes and outputs the captured still image (DC), the applied image processing module 40 preferably includes a decoding unit 110 for decoding the captured still image (DC).

The image signal processing unit 20 is known as an ISP (Image Signal Processor) and a process for digitalizing an image signal is known to those of ordinary skill in the art. Thus, its detailed description is herein omitted.

The sensor controller 30 sets an exposure value condition of the image sensor 10 under the control of the applied image processing module 40. The sensor controller 30 sets the image sensor 10 to the first exposure value condition before the shutter of the photographing device operates. When the shutter operates, the sensor controller 30 sets the image sensor 10 to the second exposure value condition. The sensor controller 30 receives parameters corresponding to the first and second exposure value conditions from the applied image processing module 40. As mentioned above, the parameters include the shutter speed 'f' and ISO gain 'I'.

The applied image processing module 40 operates in a preview mode before operation of the shutter, and operates in a still image capture mode after operation of the shutter. For this purpose, the applied image processing module 40 includes an exposure mode converting unit 120. Before operation of the shutter, the exposure mode converting unit 120 controls the sensor controller 30 to set the image sensor 10 to the first exposure value condition and operate the image sensor 10 in the preview mode. Accordingly, the image sensor 10 generates a preview image (AP) at a predetermined frame interval and outputs the preview image (AP) to the image signal processing unit 20. Then, the applied image processing module 40 receives from the image signal processing unit 20 the digitized preview image (DP) that is generated periodically in the first exposure value condition, and stores the digitized preview image (DP) in the display memory 70. The stored preview image (DP) is outputted in the form of a moving image through the display of the view finder 90.

When a shutter operates, the exposure mode converting unit 120 reads the preview image (DP) generated at the latest time before the operation of the shutter from the display memory 70 to obtain the preview image (DP). Next, the exposure mode converting unit 120 determines adaptively the second exposure value condition based on the first exposure value condition, and controls the sensor controller 30 to change an exposure value condition of the image sensor 10 from the first exposure value condition to the second exposure value condition, thereby converting into a still image capture mode.

Here, "determining adaptively the exposure value condition" means determining the second exposure value condition based on the first exposure value condition by referencing a preset reference exposure value. For this purpose, a sensor data sheet 130 is preferably provided to create a one-to-one mapping between parameters, i.e. 'f' and 'I' values, that define the second exposure value condition and parameters and 'f' and 'I' values that define the first exposure value condition. The sensor data sheet 130 is stored in a registry and is referenced when the applied image processing module 40 operates. The configuration for determining adaptively a second exposure value condition based on a first exposure value condition is not limited to the above-mentioned look-up-table example and may be implemented in other ways.

After the exposure value condition of the image sensor 10 is converted into the second exposure value condition, the applied image processing module 40 controls the sensor controller 30 to send a plurality of still image capturing signals to the image sensor 10. The image sensor 10 then continually generates a plurality of captured still images (AC) of the subject at a regular frame interval and outputs the captured still images (AC) to the image signal processing unit 20. The image signal processing unit 20 continuously receives, digitizes, scales, and outputs the plurality of captured still images to the applied image processing module 40.

The applied image processing module 40 includes a shaky-hand compensating unit 140 that compensates for motion of the other images (comparative images) based on one image (a reference image) among the plurality of captured still images (DC) through object tracking and overlapping the motion-compensated image(s) with the reference image to generate a shaky-hand compensated image.

Compensating the motion of the comparative images includes extracting objects from the reference image and the comparative images, labeling the extracted objects, matching the labeled objects, computing quantitatively a motion value of the matched object(s), and applying each computed motion value to a corresponding comparative image to compensate for motion of the comparative image.

Figure 2:
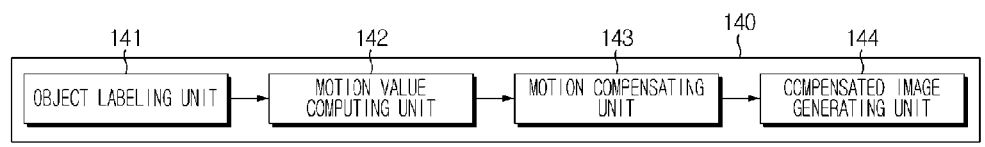
FIG. 2 is a block diagram illustrating a shaky-hand compensating unit according to an embodiment of the invention.

FIG. 2 shows the shaky hand compensating unit 140, which includes an object labeling unit 141, a motion value computing unit 142, a motion compensating unit 143, and a compensated image generating unit 144.

The object labeling unit 141 receives a plurality of captured still images (DC) from the image signal processing unit 20. The object labeling unit 141 classifies the plurality of captured still images (DC) into a reference image and comparative images. Here, the comparative images mean at least one comparative image. Then, the object labeling unit 141 converts the reference image and each comparative image into binary images, extracts objects from the reference binary image and each comparative binary image, and labels the extracted objects.

Preferably, the object labeling unit 141 selects an image taken first among captured still images (DC) as a reference image. Alternatively, the object labeling unit 141 may select an image taken last or in the midst of a plurality of captured still images (DC) as a reference image. For example, if five captured still images (DC) are taken, any one of first, third, and fifth images may be selected as a reference image.

An object is a group of white pixels connected to each other in the binary image. Where the number of pixels of the object exceeds a critical value (for example, 30,000), the object labeling unit 140 may regard the corresponding object as a background. Preferably, the object labeling unit 140 extracts the object using 4-connected component labeling or 8-connected component labeling. The 4-connected component labeling traces four pixels of upper, lower, left and right directions based on a target pixel to extract an object, and the 8-connected component labeling traces four pixels of upper, lower, left and right directions and four pixels of diagonal directions based on a target pixel to extract an object. In addition, the object labeling unit 140 may extract an object using a closed contour object scanning method or an open contour object scanning method. The above-mentioned object extraction methods are known in the art, and their description is omitted.

Figure 3:
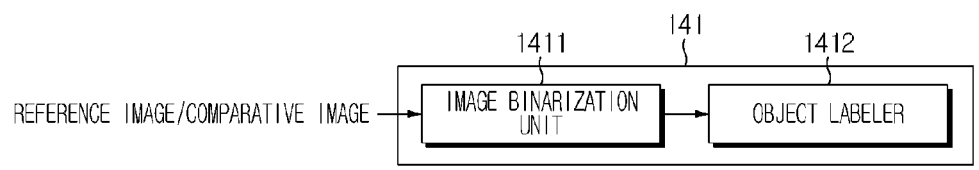
FIG. 3 is a block diagram illustrating an object labeling unit according to an embodiment of the invention.

FIG. 3 shows the object labeling unit 141 according to a first embodiment of the invention that includes an image binarization unit 1411 for converting the reference image and each comparative image into black-and-white binary images. The object labeling unit 141 also includes an object labeler 1412 that receives each binary image, extracts an object from each image, and labels the extracted object.

Image binarization involves calculating a histogram distribution of an image, and setting a pixel with brightness more than a specific threshold value as white and a pixel with brightness less than the specific threshold value as black. Hereinafter, a process for setting brightness of each pixel as black or white based on a specific threshold value is referred to as a thresholding step. The threshold value may be an average brightness value of the image calculated from the histogram distribution. However, the invention is not limited in this regard.

Figure 4:
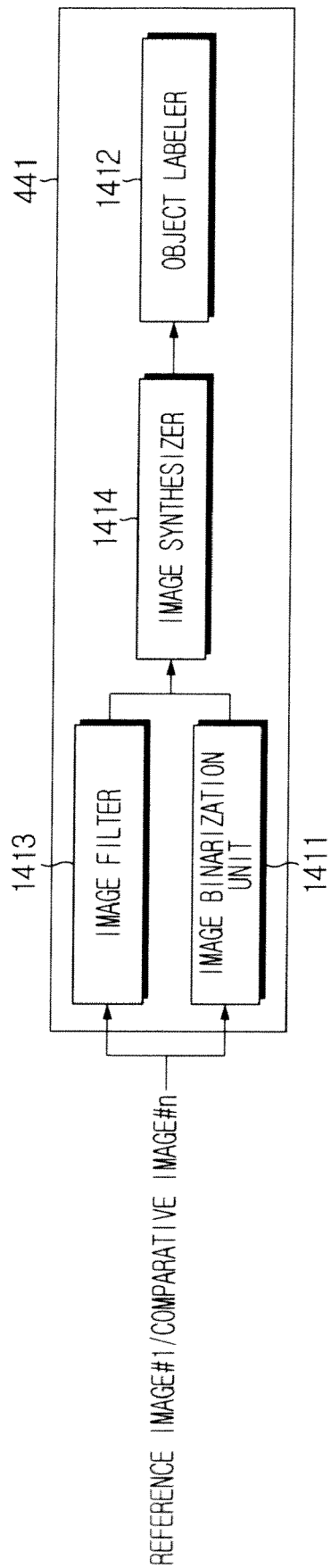
FIG. 4 is a block diagram illustrating an object labeling unit according to another embodiment of the invention.

FIG. 4 shows an object labeling unit 441 according to a second embodiment of the invention that includes an image binarization unit 1411 that converts the reference image and each comparative image into binary images through a thresholding step. Labeling unit 441 also includes an image filter 1413 that filters the reference binary image and each comparative binary image to the boundary-sharpened images. Labeling unit 441 further includes an image synthesizer 1414 that synthesizes the boundary-sharpened images outputted from the image filter 1413 with the corresponding binary images outputted from the image binarization unit 1411. An object labeler 1412 that extracts objects from the synthesized reference image and each synthesized comparative image and labels the extracted objects is also included in labeling unit 441. Here, the synthesized reference image is an image in which the binary image of the reference image is synthesized with the boundary-sharpened image of the reference image, and the synthesized comparative image is an image in which the binary image of the comparative image is synthesized with the boundary-sharpened image of the comparative image.

When the objects extracted from the reference image and the comparative images are synthesized with the boundary-sharpened image as mentioned above, the boundaries of the objects are enhanced and the objects are extracted more easily. Preferably, the image filter 1413 is a Laplacian filter or a Sobel edge filter. However, the invention is not limited to a specific kind of image filter.

Referring to FIG. 2, the motion value computing unit 142 receives labeled object data of the reference image and each comparative image from the object labeling unit. The motion value computing unit 142 then matches the object of the reference image with the object of each comparative image and calculates a parameter of each object.

Figure 7:
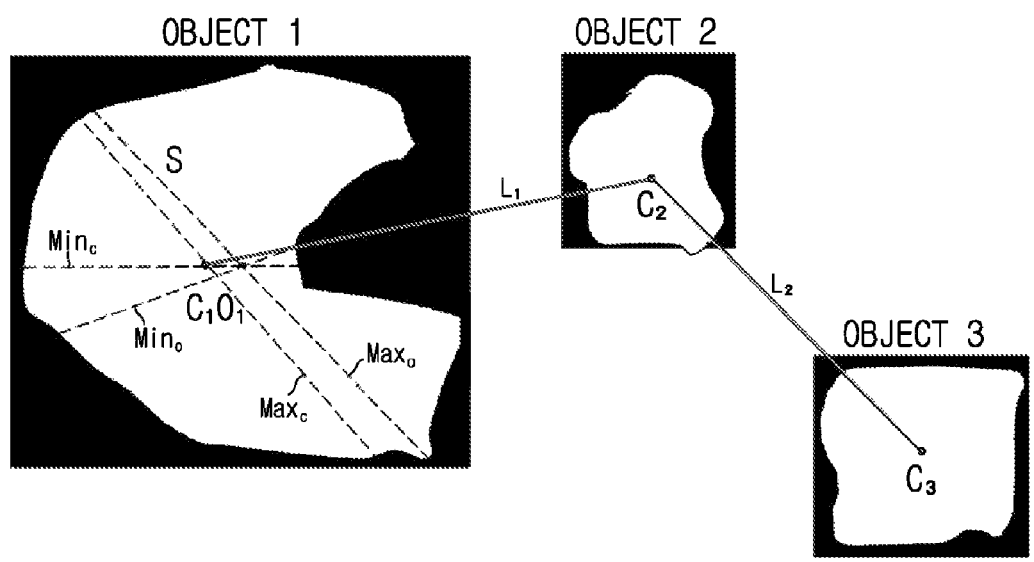
FIG. 7 conceptually illustrates object parameters calculated by a motion value computing unit according to an embodiment of the invention.

FIG. 7 illustrates conceptually a parameter of an object calculated by the motion value computing unit 142. The parameter of the object includes: an area (S) of the object; a boundary length (a periphery length of a boundary) of the object when a square boundary including the object is formed having a predetermined margin; a center coordinate (0) of the square; a centroid coordinate (C) of the object; a major axis length ($Max_O$) and a minor axis length ($Min_O$) among lines that pass through the center coordinate (0) and meet the boundary of the object at both ends and their angles; a major axis length ($Max_C$) and a minor axis length ($Min_C$) among lines that pass through the centroid coordinate (C) and meet the boundary of the object at both ends and their angles; or a length of each connection line (L) and its angle when centroid coordinates of objects are connected in a labeling order.

Next, the motion value computing unit 142 computes a motion value for each comparative image using the calculated parameter. The motion value of each comparative image is computed relative to the reference image. That is, the motion value of each comparative image indicates the degree of movement of a comparative image relative to the reference image. The motion value of each comparative image includes any one selected from the group consisting of a motion value according to translation, a motion value according to rotation, a motion value according to scaling, a motion value according to shear, or combinations thereof.

For example, the motion value according to translation is computed by averaging the differences in center coordinate or centroid coordinate between the matched objects of the reference image and each comparative image.

The motion value according to rotation is computed by matching the line connecting centroid coordinates of the reference image and each comparative image, and then averaging the angles between the connection lines. Alternatively, the motion value according to rotation is computed by matching the line connecting centroid coordinates of the reference image and each comparative image, and then averaging the differences in angle between a preset reference axis and the connection lines.

The motion value according to scaling is computed by averaging the ratios of major axis length, the ratios of minor axis length, the ratios of boundary length or the ratios of area between the matched objects of the reference image and each comparative image.

The motion value according to shear is computed using the ratios of major axis length, the ratios of minor axis length, the ratios of boundary length, and the ratios of area between the matched objects of the reference image and each comparative image, or a gradient of a profile of distribution when distribution of the differences in angle between a preset reference axis and the connection lines of centroid coordinates of the reference image and each comparative image is calculated in the horizontal and vertical directions of the images.

When various object parameters of the reference image and each comparative image are known, a motion value for each comparative image relative to the reference image may be alternatively computed by methods other than the above-mentioned methods.

The motion value computing unit 142 outputs a motion value for each comparative image to the motion compensating unit 143. The motion compensating unit 143 computes a matrix used to compensate for motion of each comparative image.

Preferably, the matrix is an affine transformation matrix. However, the invention is not limited to a specific kind of matrix. The affine transformation matrix is well known for performing matrix transformations including translation, rotation, scaling, and shear. The row and column data of a matrix can be operated on by the computed motion value.

The motion compensating unit 143 deduces a transformation matrix of each comparative image, and performs a matrix operation on each original comparative image with the deduced matrix to compensate for motion of each comparative image before binarization. The motion compensating unit 143 then outputs each motion-compensated comparative image and the reference image to the compensated image generating unit 144.

The motion compensation of a comparative image includes any one selected from the group consisting of motion compensation according to translation, motion compensation according to rotation, motion compensation according to scaling, motion compensation according to shear, or combinations thereof. To reduce the operation overhead related to motion compensation of a comparative image, it is preferable to perform an operation in the order of motion compensations according to shear, scaling, rotation, and translation. However, the invention is not limited in this regard.

The compensated image generating unit 144 receives each motion-compensated comparative image and the reference image from the motion compensating unit 143. The compensated image generating unit 144 then overlaps all comparative images with the reference image to generate a shaky hand compensated image and outputs the shaky hand compensated image.

Here, the image overlapping includes averaging the color data of the reference image and the comparative image(s) for each color channel and replacing a color data of the reference image with the obtained average value of color data for each color channel. In some cases, the color data of the reference image may be excluded when averaging color data for each color channel to overlap the images.

Figure 5:
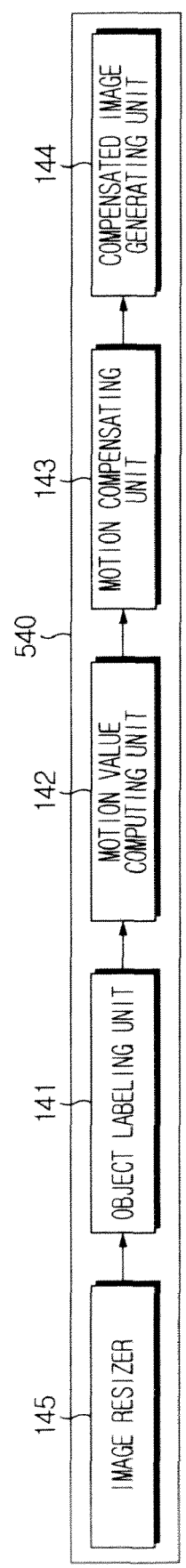
FIG. 5 is a block diagram illustrating a shaky-hand compensating unit according to another embodiment of the invention.

FIG. 5 shows another embodiment of a shaky hand compensating unit. Shaky hand compensating unit 540 includes an image resizer 145 coupled before the object labeling unit 141. The image resizer 145 either downscales the preview image (DP) and the plurality of captured still images (DC) received from the image signal processing unit 20 or clips the boundaries of the images to reduce the size of the images. The boundary clipping for image resizing is performed because an object tends to concentrate in the center portion of an image. If an image resizer 145 is included in the shaky hand compensating unit 140, the logic blocks, such as the image binarization unit 1411, the object labeler 1412, and the image filter 1413, perform operations on the smaller, resized image. Thus, an operation overhead of each logic block is reduced. After the motion value computing unit 142 computes a motion value using a comparative image resized by downscaling, the motion value computing unit 142 may convert the computed motion value on the basis of an original comparative image based on the downscaling factor.

Figure 6:
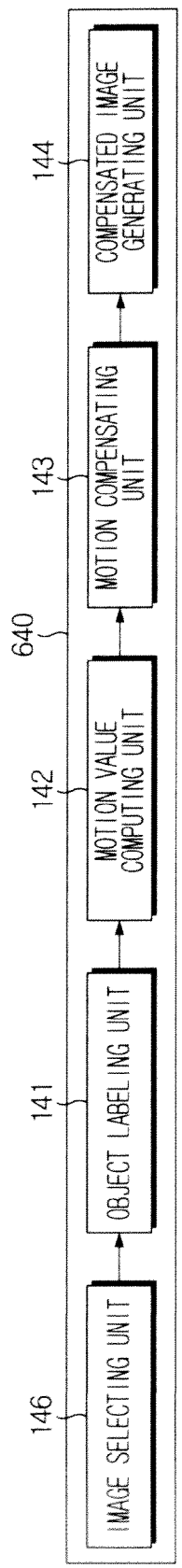
FIG. 6 is a block diagram illustrating a shaky-hand compensating unit according to yet another embodiment of the invention.

FIG. 6 shows yet another embodiment of a shaky hand compensating unit. Shaky hand compensating unit 640 includes an image selecting unit 146 coupled before the object labeler 141. The image selecting unit 146 classifies the plurality of captured still images (DC) into a reference image and comparative images. The basis for selecting the reference image is mentioned above. The image selecting unit 146 computes a motion vector for each comparative image relative to the reference image. The motion vector for each comparative image is an index that indicates the degree of movement of a comparative image relative to the reference image, and is computed in the typical manner of well-known image compression standards such as MPEG (Moving Picture Experts Group) or H.26x. Then, if the magnitude of a motion vector is excessively large or a motion vector is not computed, the image selecting unit 146 determines that a subject included in the reference image is different from a subject included in a comparative image, and excludes the corresponding comparative images from the images for shaky hand compensation. This may occur because the amount of hand tremor was excessive or suddenly another subject invaded the image pickup range at the time of taking a comparative image. On the other hand, if a motion vector of a comparative image is in a proper range, the image selecting unit 146 determines that the comparative image can be used to compensate for shaky hands effect, and inputs the preview image (DP) and the captured still images (DC) into the object labeling unit 141. The object labeling unit 141 then performs an object labeling operation as mentioned above.

In addition, the image selecting unit 146 computes quantitatively a difference in brightness between the reference image and each comparative image. If the difference is smaller than a predetermined level, the image selecting unit 146 excludes the corresponding comparative image from shaky hand compensation. For example, the image selecting unit 146 computes an XOR-operated image between the reference image and a comparative image, averages the brightness of the XOR-operated image, and defines the obtained average of brightness as a difference in brightness between the reference image and the comparative image. If the difference in brightness between the reference image and the comparative image is smaller than a predetermined level (for example, 0.85), the image selecting unit 146 determines that a meaningful motion of an object does not exist, and does not output the corresponding comparative image to the object labeling unit 141. On the other hand, if the difference between the reference image and the comparative image is greater than a predetermined level (for example, 0.85), the image selecting unit 146 determines that a meaningful motion of an object does exist, and outputs the corresponding comparative image to the object labeling unit 141. As mentioned above, image selection using the difference in brightness between the reference image and each comparative image can reduce the operation overhead for object labeling.

The image selecting unit 146 may be interposed between the image resizer 145 and the object labeling unit 141 of FIG. 5. In this case, the image selecting unit 146 performs the above-mentioned operation on the resized reference image and comparative images.

Figure 8:
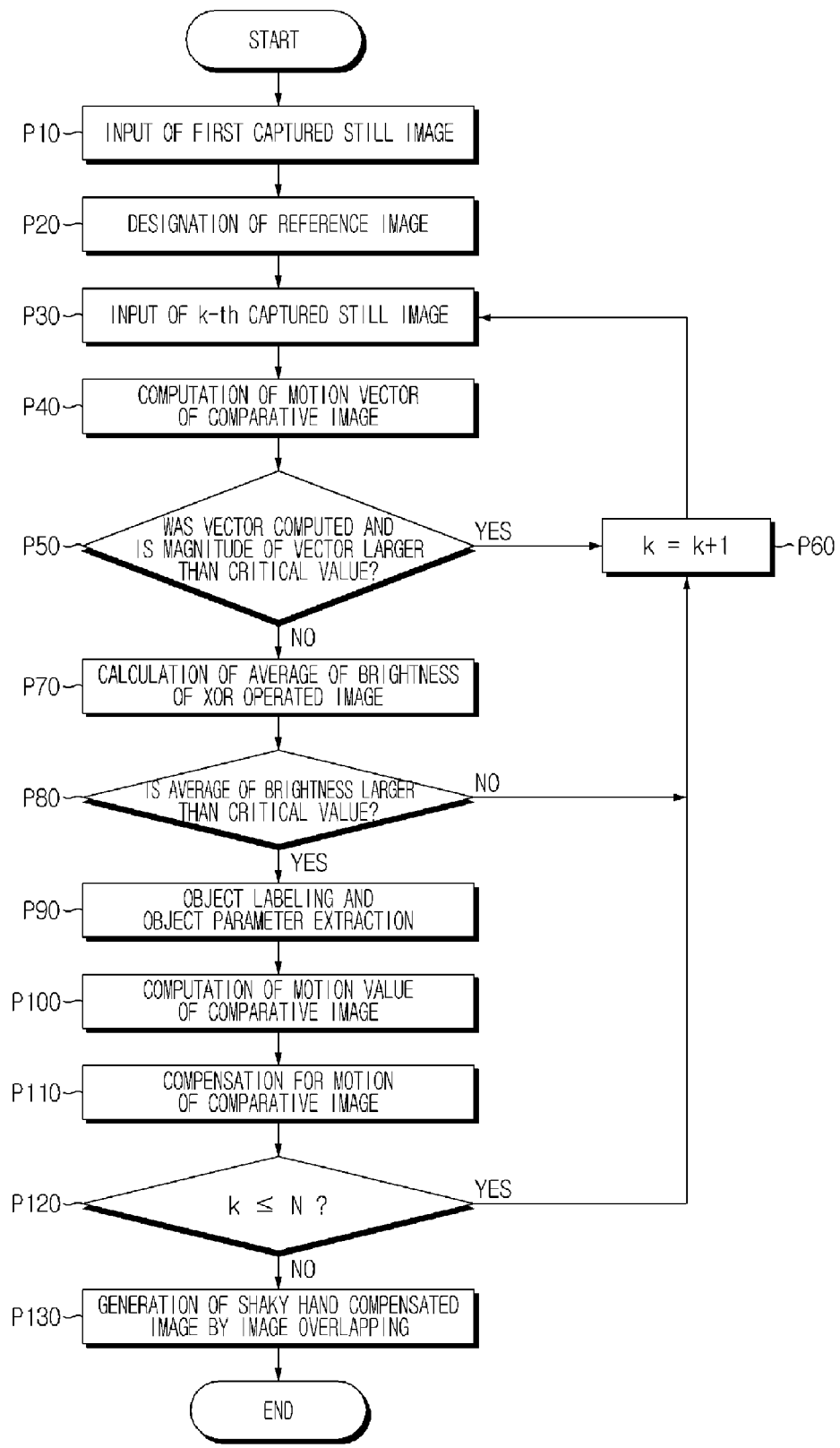
FIG. 8 is a flow chart illustrating the operation of the shaky-hand compensating unit according to an embodiment of the invention.

FIG. 8 shows an example of the operation of the shaky hand compensating unit 140 according to the invention. Each of the described steps is performed by the shaky hand compensating unit 140.

A first captured still image is inputted (P10) and designated as a reference image (P20). Note that a captured still image used as a reference image may be arbitrarily changed, and captured still images taken after the reference image become comparative images.

A second captured still image (k=2) is inputted as a comparative image (P30), and a motion vector of the comparative image relative to the reference image is computed (P40). The computed motion vector is compared with a critical value to determine whether the magnitude of the motion vector exceeds a critical value (P50).

If it was determined in P50 that the motion vector was not computed or that the computed motion vector exceeds a critical value, an object labeling step of the comparative image is not performed, but P60 is performed instead. If it was determined in P50 that the computed motion vector does not exceed a critical value, P70 is performed to compute quantitatively a difference in brightness between the reference image and the comparative image. For example, an XOR-operated image of the reference image and the comparative image is computed, an average brightness of the XOR-operated image is calculated, and the average of brightness is defined as a difference in brightness between the reference image and the comparative image.

Next, the process checks whether the difference in brightness between the reference image and the comparative image exceeds a preset critical value. If the difference in brightness exceeds a preset critical value, a meaningful movement of an object exists in the comparative image and an object labeling step is performed (P90). If the difference in brightness does not exceed a preset critical value, an object labeling step of the comparative image is omitted, and P60 is performed.

Objects are extracted from the reference image and the comparative image, and object parameters are computed through a geometric operation (P90). Preferably, the object extraction from an image is performed such that the image is converted into a binary image. A group of white pixels connected to each other in the binary image is recognized as an object and the object is extracted. More preferably, object extraction from an image is performed such that the image is filtered for boundary sharpness and synthesized before an object is recognized and extracted from the synthesized image of the boundary-sharpened binary image. A process for extracting an object parameter is described above in detail.

The object parameters extracted from the reference image and the comparative image are matched with each other, and a motion value of the comparative image is computed relative to the reference image (P100). Here, a motion value of each comparative image includes any one selected from the group consisting of a motion value according to translation, a motion value according to rotation, a motion value according to scaling, a motion value according to shear, or combinations thereof. A matrix for motion compensation is then computed using the computed motion value, and the comparative image is compensated for motion by affine transformation (P110).

Next, the process checks that an order (k) of the motion-compensated comparative image reached a preset number (N) (P120). N is the number of captured still images used to compensate for shaky hands of an image and is set in advance. According to P120, if k is smaller than or equal to N, P60 is performed to increase an order of the comparative image by one increment and the process returns to P30. Then, second to Nth captured still images are inputted as comparative images, motion values of the comparative images are computed, and the comparative images are compensated for motion using the motion values. This process repeats until k is larger than N. If k is larger than N, all comparative images are compensated for motion, and P130 is thus performed.

The motion-compensated comparative image and the comparative image without substantial motion (where motion of an object is judged to not substantially exist) are overlapped with the reference image to generate a shaky hand compensated image (P130). The image overlapping is described above in more detail. In some cases, the comparative image where motion of an object is judged to not substantially exist may be excluded from images for image overlapping. P40 to P80 may be omitted for those images to reduce the operational overhead of the shaky hand compensating unit 140.

Although not shown in FIG. 8, the invention may further include either downscaling the reference image and the comparative image or resizing the reference image and the comparative image by clipping the boundaries of the images prior to extracting the objects from the reference image and the comparative image. The invention may also further include an image selecting step. After a motion vector of the comparative image relative to the reference image is computed, and if the magnitude of the motion vector exceeds a critical value, then the corresponding comparative image is excluded from motion compensation. After a difference in brightness between the reference image and the comparative image is computed, and if the difference in brightness does not exceed a critical value, then the corresponding comparative image is excluded from motion compensation. The image resizing step or the image selecting step can reduce the operational overhead required for object extraction.

Image property correction after obtaining the shaky hand compensated image is now described.

Referring to FIG. 1, after the shaky hand compensated image is generated by the shaky hand compensating unit 140, various properties of the shaky hand compensated image are corrected using the preview image (DP) obtained in the preview mode.

Preferably, the properties of the shaky hand compensated image corrected by using the preview image (DP) include the image color, the image noise, and the image brightness. For this purpose, the applied image processing module 40 is provided with an image property correcting unit 150 that includes a color correcting unit 151, a noise correcting unit 152, and a brightness correcting unit 153. Preferably, image property correction of the shaky hand compensated image is performed in the order of correcting image color, image noise, and image brightness in sequence. However, the invention is not limited to a specific order of image property correction, and image property correction may be performed in an arbitrary order.

Figure 9:
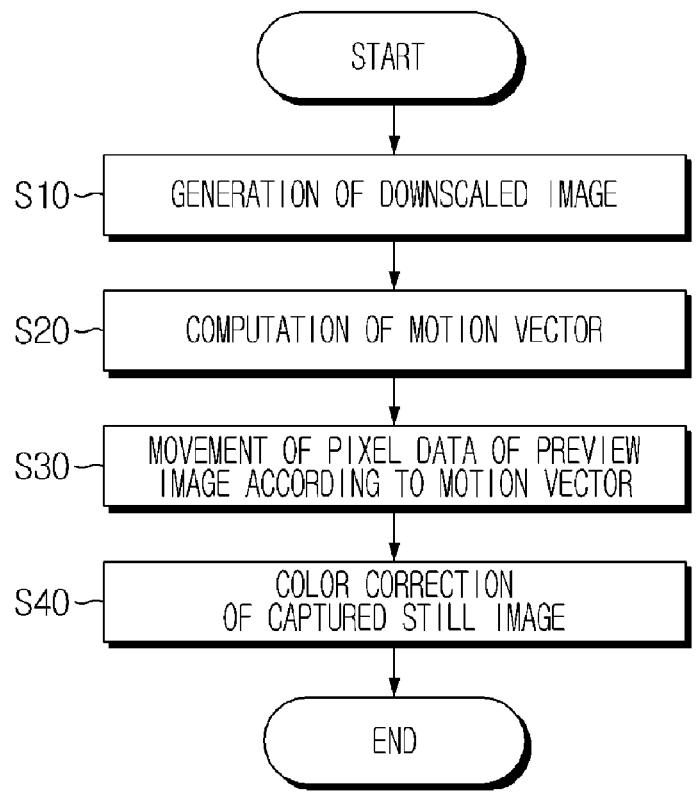
FIG. 9 is a flow chart illustrating a process in which a color correcting unit of an applied image processing module corrects the color of a shaky-hand compensated image based on a preview image.

The color correcting process is described with reference to FIGS. 1 and 9. First, the color correcting unit 151 scales the shaky hand compensated image to a size of the preview image (DP) to generate a downscaled image (S10). Next, the color correcting unit 151 computes a motion vector of the downscaled image using the preview image (DP) as a reference image (S20). The motion vector indicates a movement direction and a movement amount of an object included in the downscaled image relative to the preview image (DP). The motion vector may be computed in the typical manner of well-known image compression standards such as MPEG (Moving Picture Experts Group) or H.26x. That is, the motion vector is computed in such a way that the downscaled image is divided into blocks of uniform size, and an area of the reference image from which each block was moved is inferred. After the motion vector is computed, the color correcting unit 151 moves a location of each pixel data of the preview image (DP) according to the motion vector (S30). The color correcting unit 151 then corrects the pixel data of the shaky hand compensated image using an interpolation method based on the preview image (DP) where a location movement process of each pixel data is completed (S40). That is, the color correcting unit 151 converts a location $(x_i, y_j)$ of each pixel data of the preview image (DP) into a location $(X_I,$ $Y_j$) of the shaky hand compensated image based on the scaling factor (applied when generating the downscaled image). Next, the color correcting unit 151 replaces the pixel data corresponding to the location ($X_I$, $Y_J$) of the shaky hand compensated image with the pixel data corresponding to the location ($x_i$, $y_j$) of the preview image (DP). The number of pixels of the preview image (DP) is less than that of the shaky hand compensated image, and thus all pixel data of the shaky hand compensated image is not replaced by pixel data of the preview image (DP). Therefore, the color correcting unit 151 interpolates pixel data of the shaky hand compensated image to fill the pixels that are not replaced by the pixel data of the preview image (DP) using adjacent replaced pixel data. The interpolation method includes Bi-linear, Bi-Cubic or B-spline; however, the invention is not limited in this regard.

The shaky hand compensated image that passed through the above-mentioned color correcting process is inputted to the noise correcting unit 152 of the applied image processing module 40. The noise correcting unit 152 removes the noise and the false color of the shaky hand compensated image using various well-known noise filters. The filters may include a low pass filter, a Median filter, a Gaussian filter, a Laplacian of Gaussian filter or a Difference of Gaussian filter. However, the invention is not limited in this regard, and other well-known filtering techniques may be used to remove noise.

The shaky hand compensated image that passed through removal of noise and false color as mentioned above is inputted to the brightness correcting unit 153. The brightness correcting unit 153 performs the following: computes quantitatively a difference in brightness between the preview image (DP) and the shaky hand compensated image, determines adaptively a brightness correcting intensity of the shaky hand compensated image, and corrects brightness of the shaky hand compensated image.

Figure 10:
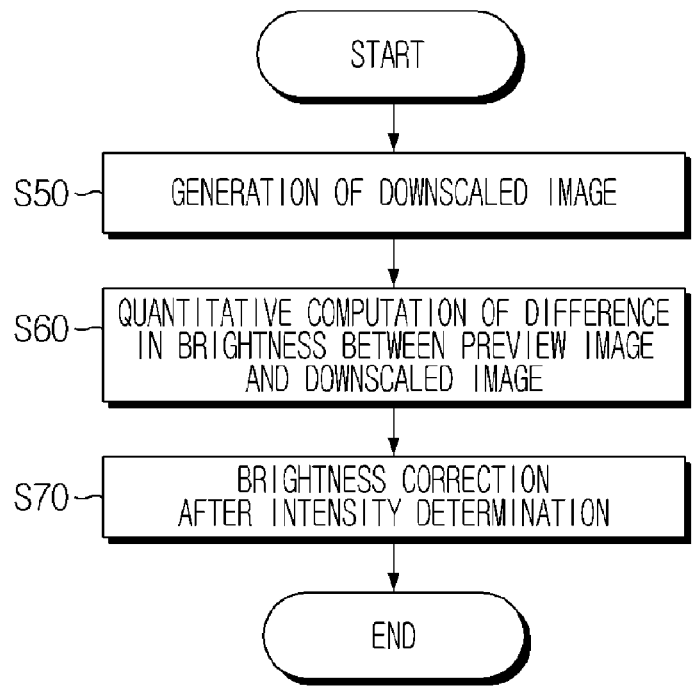
FIG. 10 is a flow chart illustrating a process in which a brightness correcting unit of the applied image processing module corrects the brightness of a shaky-hand compensated image based on a preview image.

The brightness correcting process is described with reference to FIGS. 1 and 10. First, the brightness correcting unit 153 downscales the shaky hand compensated image to a size of the preview image (DP) to generate a downscaled image (S50). At this time, the step S50 need not be performed separately, and the downscaled image generated for the color correction may be used again. Next, the brightness correcting unit 153 computes quantitatively a difference in brightness between the downscaled image and the preview image (DP) (S60). The difference in brightness may be computed using a difference in average values of histograms between the two images. For example, in the case that average values of histograms of the downscaled image and the preview image (DP) are '85' and '140', respectively, the difference in average values is '55'. Next, the brightness correcting unit 153 determines adaptively a brightness correcting intensity according to the difference in average values, and corrects brightness of the shaky hand compensated image by the determined correcting intensity (S70). A gamma function or a Retinex algorithm may be applied to the brightness correction. In this case, the brightness correcting intensity is an intensity of a gamma function or Retinex algorithm. To select adaptively an intensity of a brightness correcting algorithm, it is preferable to select an intensity level according to the difference in average values in the form of a lookup table 170 and to reference the lookup table 170.

The difference in brightness between the shaky hand compensated image and the preview image (DP) may be computed quantitatively by a difference between parameters that define the first exposure value and the second exposure value. That is, a difference in brightness between the shaky hand compensated image and the preview image (DP) may be computed by a difference between parameters, e.g., 'f' and 'I', that define the first exposure value and the second exposure value. For example, in the case that 'f' and 'I' values corresponding to the first exposure value are '1/30' and '200', respectively, and 'f' and 'I' values corresponding to the second exposure value are '1/60' and '100', respectively, the differences in shutter speed and ISO gain are computed quantitatively as '1/60' and '100', respectively. Next, the brightness correcting unit 153 determines adaptively a brightness correcting intensity by the differences in 'f' and 'I' values and accordingly corrects the brightness of the shaky hand compensated image. A gamma function or a Retinex algorithm may be applied to the brightness correction in the same way as the above-mentioned embodiment. In this case, the brightness correcting intensity is an intensity of a gamma function or Retinex algorithm. To select adaptively an intensity of a brightness correcting algorithm, it is preferable to select an intensity level according to differences in 'f' and 'I' values in the form of a lookup table and to reference the lookup table. The gamma function or Retinex algorithm used to correct brightness of the shaky hand compensated image in the invention is known in the prior art, and its detailed description is herein omitted. Note that the invention is not limited to a specific kind of brightness correcting function or algorithm, and various other known techniques for adjusting brightness of the shaky hand compensated image may be used.

After being processed by the color correcting unit 151, the noise correcting unit 152 and the brightness correcting unit 153, the shaky hand compensated image is encoded and outputted. For this purpose, the applied image processing module 40 further includes an encoding unit 160 for encoding the shaky hand compensated image. Preferably, the encoding unit 160 encodes the shaky hand compensated image by the JPEG standards to generate an image file. However, the invention is not limited to a specific encoding method. The image file outputted from the encoding unit may be stored in an inactive storage medium of the digital photographing device, such as a flash memory.

The user interface 60 is a general interface provided to a digital photographing device to operate a shutter and adjust various parameters necessary for obtaining a digital image—for example focus, optical or digital zoom-in/zoom-out, white balance or exposure mode of a digital camera. If the digital photographing device is mounted in a hand-held terminal such as a mobile phone, the user interface 60 may be embodied as a keypad of the hand-held terminal.

A digital photographing process using the apparatus for digital image stabilization with object tracking configured as mentioned above is now described. The following assumes that a photographing mode is initiated through manipulation of the user interface 60 after operation of the digital photographing device.

Figure 11:
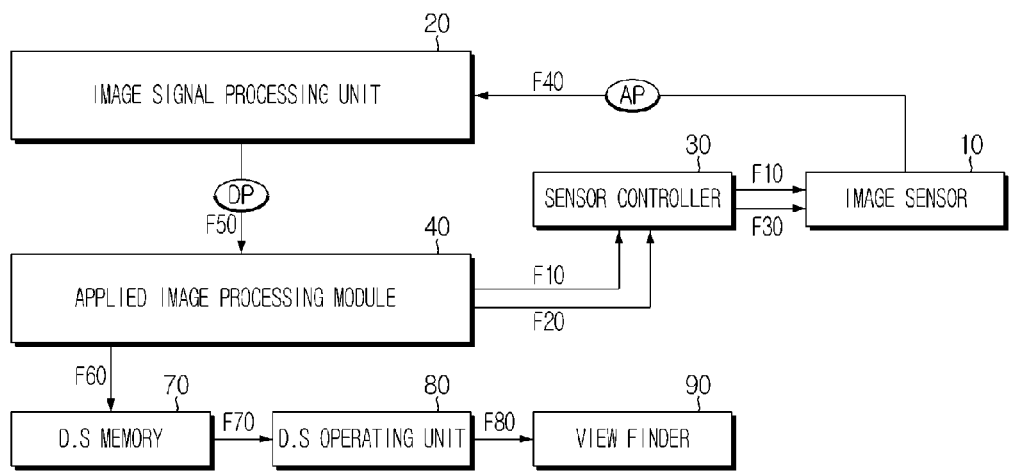
FIG. 11 is a block diagram showing a process flow from generation of a preview image in a preview mode to output of the preview image through a view finder.

Referring to FIGS. 1 and 11, when the photographing mode starts, the applied image processing module 40 loads a sensor data sheet 130 into storage that is used to select the second exposure value condition based on the first exposure value condition. The applied image processing module 40 then controls the sensor controller 30 to set the image sensor 10 to the first exposure value condition (F10). The parameters for defining an exposure value, such as a shutter speed 'f' and ISO gain 'I', are referenced in the sensor data sheet 130. Preferably, the first exposure value condition corresponds to an auto exposure mode. Alternatively, the first exposure value condition may be set arbitrarily by a user through the user interface 60.

When the image sensor 10 is set to the first exposure value condition, the applied image processing module 40 requests the generation of a preview image to the sensor controller 30

(F20). The sensor controller 30 then sends periodically a preview image generation signal to the image sensor 10 (F30). The image sensor 10 then outputs the preview image (AP) of a subject to the image signal processing unit 20 in the form of an analog image signal at a regular frame interval (F40). The image signal processing unit 20 digitizes the preview image signal received periodically from the image sensor 10, downscales the digitized image signal to a size of the display of the view finder 90, and outputs the downscaled image to the applied image processing module 40 (F50). The applied image processing module 40 receives the downscaled preview images (DP) and stores the periodically received preview images (DP) in the display memory 70 (F60). The display operating unit 80 reads the preview images (DP) stored in the display memory 70 (F70) and converts the preview image (DP) into an analog image signal. The display operating unit 80 then outputs the preview image (DP) at a regular interval through the display of the view finder 90 (F80).

Figure 12:
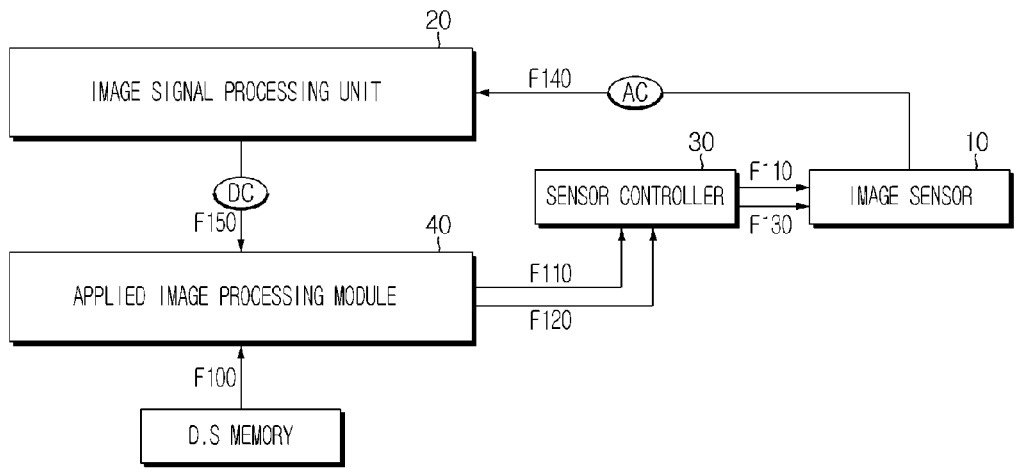
FIG. 12 is a block diagram showing a process flow in which an image blurring phenomenon of a captured still image is corrected.

FIG. 12 shows a process in which an image blurring phenomenon of a captured still image is corrected. The process includes generating a preview image (DP) and a shaky hand compensated image at the time a shutter of a digital photographing device is operated. The process also includes correcting a property of the shaky hand compensated image based on a property of the preview image (DP).

Referring to FIGS. 1 and 12, when a photographer captures a desired image in the display of the view finder 90 and operates the shutter, the applied image processing module 40 changes the image processing mode from a preview mode to a still image capture mode. The applied image processing module 40 then reads from the display memory 70 the last preview image (DP) generated before operation of the shutter (F100). Next, the applied image processing module 40 determines adaptively the second exposure value condition based on the first exposure value condition by referencing the sensor data sheet, and then controls the sensor controller 30 to set the image sensor 10 to the second exposure condition (F110). A configuration for calculating the second exposure value condition based on the first exposure value condition is described above.

When the image sensor 10 is set to the second exposure value condition, the applied image processing module 40 sends a request for generation of a plurality of captured still images to the sensor controller 30 (F120). The sensor controller 30 sends a plurality of captured still image generating signals to the image sensor 10 (F130). The image sensor 10 then continually captures a plurality of captured still images (AC) of a subject at regular intervals and sequentially outputs the captured still images (AC) to the image signal processing unit 20 in the form of an analog image signal (F140). The image signal processing unit 20 digitizes the plurality of captured still images (AC) received from the image sensor 10, scales the sizes of the digitized images to an image size set by the photographer through the user interface 60, and outputs the scaled images to the applied image processing module 40 (F150).

The applied image processing module 40 then classifies the plurality of captured still images (DC) such that a single captured still image is used as a reference image and the other captured still images are used as comparative images. The applied image processing module 40 compensates for motion of the comparative images relative to the reference image, and overlaps the motion-compensated comparative images with the reference image to generate a shaky hand compensated image. Next, the applied image processing module 40 corrects the color and the brightness of the shaky hand compensated image using the color and the brightness properties of the preview image (DP) and removes various noises and color faults from the shaky hand compensated image to produce a captured still image free of an image blurring phenomenon caused by shaky hands. The resulting captured still image is encoded and recorded into a storage medium in the form of a file or is outputted through the view finder 90.

Figure 13:
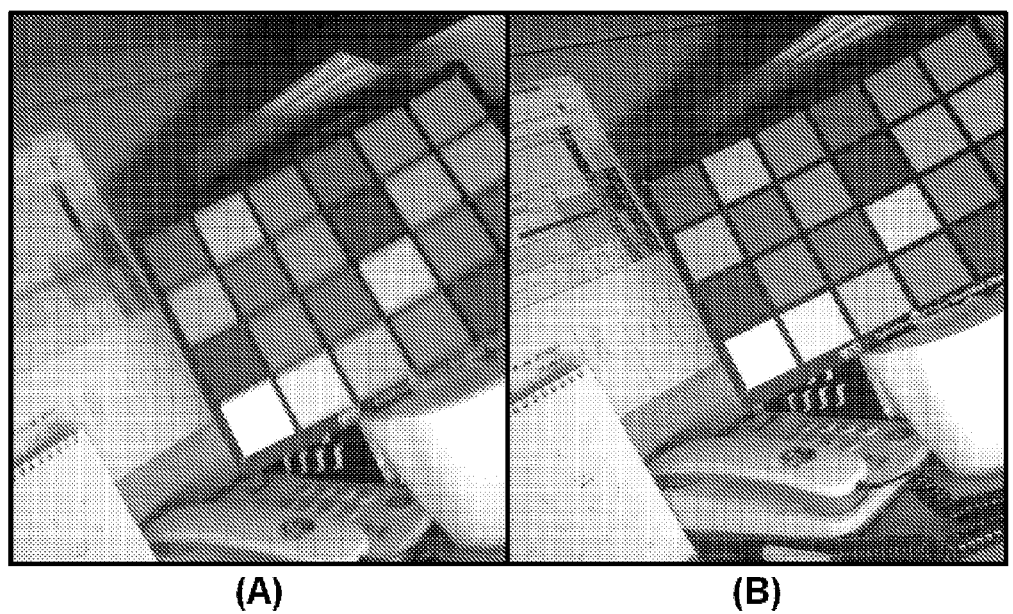
FIG. 13 illustrates an image (A) taken by a typical digital photographing device without an image stabilization function in an auto exposure mode and an image (B) taken by a digital photographing device implementing a method for digital image stabilization using object tracking according to the invention.

FIG. 13 compares an image (A) taken by a typical digital photographing device in an auto exposure mode without an image stabilization function with an image (B) taken by a digital photographing device executing the digital image stabilization method using object tracking according to the invention. As shown in FIG. 13, the image obtained with the digital image stabilization of the invention is free of an image blurring phenomenon and is brighter and clearer.

In the above-mentioned embodiment, the image signal processing unit 20 and the applied image processing module 40 are shown as separate units divided according to their functions. However, the image signal processing unit 20 and the applied image processing module 40 may be integrated into a single module. Alternatively, at least one sub-element included in the applied image processing module 40 may be constructed as a separate module.

Note that the scaling factor of the preview image (DP) is not limited by the size of the display of the view finder 90. The scaling factor of the preview image (DP) may vary depending on a size of captured still images (DC) for motion compensation. For example, the scaling factor of the preview image (DP) may be adjusted such that the width and height of the captured still image (DC) is an integral number times as much as those of the preview image (DC). In this case, the operational overhead is reduced in mapping the locations of pixel data of the preview image (DP) and the captured still image (DC) when correcting color of the captured still image (DC).

The method for digital image stabilization according to the invention may be incorporated as a computer readable code in a computer readable storage medium. The computer readable storage medium includes all kinds of storage devices for storing data readable by a computer system. Some examples are ROM, RAM, CD-ROM, a magnetic tape, a floppy disc or an optical data storage device. The computer readable storage medium may store a code that is dispersed in computer systems connected to each other via a network and is readable by a computer through a dispersion method.

According to an aspect of the invention, unlike EIS or OIS technique, the invention can remove an image blurring phenomenon caused by shaky hands without additional hardware for measuring a degree of shaky hands, such as an angular velocity sensor or a prism. Consequently, this invention reduces manufacturing costs of a digital photographing device and produces a digital still image of good quality.

According to another aspect of the invention, unlike DIS technique, the invention does not involve digital zoom when storing a captured still image. Thus, this invention can produce a digital still image of better quality than that produced by the DIS technique.

According to another aspect of the invention, the invention corrects a captured still image using a preview image that retains the brightness and color properties of a subject. Thus, this invention can produce a clearer and brighter digital still image.

According to still another aspect of the invention, the invention removes the noise created when correcting color data of a captured still image using a filter, thus improving the quality of an image.

Note that only a few embodiments of the invention are described above. Other implementations, enhancements and variations can be made based the invention described and illustrated herein. The invention is therefore only limited by the following claims.

What is claimed is:

1. An apparatus for digital image stabilization comprising:
an image signal processing unit operative to output a first digital image obtained under a first exposure value condition and a plurality of second digital images obtained under a second exposure value condition;
a compensating unit operative to compensate for motion in a plurality of comparative second digital images relative to a reference second digital image using object tracking, and generate a compensated image by overlapping each compensated comparative image with the reference image; and an image property correcting unit operative to correct a property of the compensated image based on a property of the first digital image wherein an object labeling unit operative to classify the plurality of second digital images into a reference image and one or more comparative images, and label an object of the reference image and an object of each comparative image using object tracking; a motion value computing unit operative to match the object of each comparative image with the object of the reference image, calculate a parameter of the matched object, and compute a motion value of each comparative image relative to the reference image with the calculated parameter; a motion compensating unit operative to apply each computed motion value to a corresponding comparative image to compensate for motion of each comparative image;
and a compensated image generating unit operative to overlap each motion-compensated comparative image with the reference image to generate a compensated image.

2. The apparatus of claim 1, wherein:
the first exposure value condition is an exposure value condition of an auto exposure mode, and
the second exposure value condition is an exposure value condition corresponding to a luminance lower than a luminance of the auto exposure mode.

3. The apparatus of claim 1, wherein:
the image signal processing unit is operative to receive an image signal under the first exposure value condition and a plurality of image signals under the second exposure value condition from an image sensor; and
the apparatus further comprises an exposure mode converting unit operative to:
determine adaptively the second exposure value condition based on the first exposure value condition, and
change an exposure property of the image sensor from the first exposure value condition to the second exposure value condition.

4. The apparatus of claim 3, further comprising:
a sensor controller operative to change an exposure value condition of the image sensor; and
a sensor data sheet defining the second exposure value condition based on the first exposure value condition; and
wherein the exposure mode converting unit determines the second exposure value condition based on the first exposure value condition by referencing the sensor data sheet, and controls the sensor controller to change the exposure value condition of the image sensor to the second exposure value condition.

5. The apparatus of claim 1, wherein the first digital image is a preview image obtained in an auto exposure mode.

6. The apparatus of claim 5, wherein the first digital image is a preview image generated before an operation of a shutter where a preview image is generated at a regular frame interval in a preview mode.

7. The apparatus of claim 1, wherein the second digital images are full-size captured still images generated at a regular time interval in an image capture mode.

8. The apparatus of claim 1, wherein the object labeling unit comprises:
an image binarization unit operative to convert the reference image and each comparative image into binary images; and an object labeler operative to: extract objects from the reference binary image and each comparative binary image, and label the extracted objects.

9. The apparatus of claim 8, wherein the object labeling unit further comprises:
an image filter operative to filter the reference image and each comparative image to sharpen boundaries of the images; and
an image synthesizer operative to synthesize the boundary-sharpened images outputted from the image filter with the binary images,
wherein the object labeler labels objects from the synthesized images.

10. The apparatus of claim 8, further comprising an image resizer operative to resize the plurality of second digital images, before the second digital images are processed by the object labeling unit, by scaling sizes of the second digital images to a predetermined size or clipping boundaries of a predetermined width from the second digital images.

11. The apparatus of claim 8, further comprising an image selecting unit operative to exclude a comparative image from images for object labeling if:
a magnitude of the motion vector of the comparative image relative to the reference image exceeds a first critical value, or
a difference in brightness between the reference image and the comparative image does not exceed a second critical value.

12. The apparatus of claim 8, wherein the motion value of each comparative image comprises any one selected from a group consisting of a motion value according to translation, a motion value according to rotation, a motion value according to scaling, a motion value according to shear, or combinations thereof.

13. The apparatus of claim 1, wherein the image property correcting unit comprises a color correcting unit for correcting a color of the compensated image by:
replacing pixel data of the compensated image with pixel data of the first digital image, or
interpolating pixel data of the compensated image based on pixel data of the first digital image in consideration of a size ratio between the compensated image and the first digital image.

14. The apparatus of claim 1, wherein the image property correcting unit comprises a brightness correcting unit operative to:
compute a difference in brightness between the first digital image and the compensated image,
select adaptively a brightness correcting intensity, and
correct the brightness of the compensated image by the selected brightness correcting intensity.

15. A method for digital image stabilization using object tracking comprising:
receiving a first digital image obtained under a first exposure value condition and a plurality of second digital images obtained under a second exposure value condition; compensating for motion in a plurality of comparative second digital images relative to a reference second digital image using object tracking; generating a compensated image by overlapping each compensated comparative image with the reference image; and correcting a property of the compensated image based on a property of the first digital image the compensating for motion comprises:

classifying the plurality of second digital images into a reference image and comparative images; extracting objects from the reference image and each comparative image, labeling the extracted objects, and calculating a parameter of each labeled object; matching the object of each comparative image with the object of the reference image, and computing a motion value of each comparative image using the parameter of the matched object; applying each computed motion value to a corresponding comparative image to compensate for motion of each comparative image;

and overlapping each motion-compensated comparative image with the reference image to generate a shaky hand compensated image.

16. The method of claim 15, further comprising before the receiving of first and second digital images:
    loading a sensor data sheet defining the second exposure value condition based on the first exposure value condition;
    sensing the first exposure value condition under which the first digital image is taken;
    determining adaptively the second exposure value condition based on the first exposure value condition by referencing the sensor data sheet; and
    changing an exposure property of an image sensor from the first exposure value condition to the second exposure value condition.

17. The method of claim 15, wherein
    the first exposure value condition is an exposure value condition of an auto exposure mode, and
    the second exposure value condition is an exposure value condition corresponding to a luminance lower than a luminance of the auto exposure mode.

18. The method of claim 15, wherein the first digital image is a preview image generated before an operation of a shutter where a preview image is generated at a regular frame interval in an auto exposure mode.

19. The method of claim 15, wherein the second digital images are captured still images generated at a regular time interval in an image capture mode.

20. The method of claim 15, wherein the extracting of objects comprises:
    converting an image for object extraction into a binary image;
    detecting an object, the object comprising a plurality of white pixels connected to
    each other in the binary image; and extracting the object.

21. The method of claim 15, wherein the extracting of objects comprises: filtering an image to sharpen a boundary of the image; converting the image into a binary image;
    synthesizing the boundary-sharpened image with the binary image;
    detecting an object, the object comprising a plurality of white pixels connected to each other in the synthesized image; and
    extracting the object.

22. The method of claim 15, further comprising before the extracting of objects: scaling or boundary-clipping each second digital image to a predetermined size to resize the second digital image; or
    excluding a comparative image from images for object labeling if:
    the magnitude of a motion vector of the comparative image exceeds a first critical value, or a difference in brightness between the reference image and the comparative image does not exceed a second critical value.

23. The method of claim 15, wherein the motion value of each comparative image comprises any one selected from a group consisting of a motion value according to translation, a motion value according to rotation, a motion value according to scaling, a motion value according to shear, or combinations thereof.

24. The method of claim 15, wherein the correcting of a property comprises correcting a color of the compensated image by:
    replacing a pixel data of the compensated image with pixel data of the first digital image, or
    interpolating the pixel data of the compensated image based on pixel data of the first digital image in consideration of a size ratio between the compensated image and the first digital image.

25. The method of claim 15, wherein the correcting of a property comprises:
    computing a difference in brightness between the first digital image and the compensated image;
    selecting adaptively a brightness correcting intensity; and
    correcting the brightness of the compensated image by the selected brightness correcting intensity.

* * * * *